(12) United States Patent
Strandberg et al.

(10) Patent No.: US 12,094,635 B2
(45) Date of Patent: Sep. 17, 2024

(54) INDUCTOR ASSEMBLY

(71) Applicant: Vacon Oy, Vaasa (FI)

(72) Inventors: Stefan Strandberg, Vörå (FI); Nicklas Jan Anders Södö, Vaasa (FI)

(73) Assignee: VACON OY, Vaasa (FI)

( * ) Notice: Subject to any disclaimer, the term of this patent is extended or adjusted under 35 U.S.C. 154(b) by 599 days.

(21) Appl. No.: 17/097,074

(22) Filed: Nov. 13, 2020

(65) Prior Publication Data
US 2021/0151240 A1    May 20, 2021

(30) Foreign Application Priority Data

Nov. 15, 2019  (DE) .......................... 102019130839.9

(51) Int. Cl.
*H01F 27/26* (2006.01)
*H01F 27/28* (2006.01)

(52) U.S. Cl.
CPC ....... *H01F 27/263* (2013.01); *H01F 27/2823* (2013.01)

(58) Field of Classification Search
CPC .. H01F 37/00; H01F 27/34; H01F 2017/0093; H01F 27/263; H01F 27/2823; H01F 27/40; H01F 27/38; H01F 27/24; H01F 27/2828; H01F 27/42
See application file for complete search history.

(56) References Cited

U.S. PATENT DOCUMENTS

| | | | | |
|---|---|---|---|---|
| 1,604,478 A | * | 10/1926 | Orton | H01F 17/00 336/225 |
| 6,867,564 B1 | * | 3/2005 | Wu | H01F 37/00 318/448 |
| 6,987,372 B1 | * | 1/2006 | Wu | H02M 5/4585 318/448 |
| 7,796,003 B2 | * | 9/2010 | Hashino | H01F 37/00 336/212 |
| 8,536,971 B1 | * | 9/2013 | Waseem | H01F 38/42 336/212 |
| 9,870,857 B2 | * | 1/2018 | Hirai | H01F 27/34 |
| 2003/0206087 A1 | * | 11/2003 | Raff | H01F 3/12 336/182 |

(Continued)

FOREIGN PATENT DOCUMENTS

| | | |
|---|---|---|
| DE | 102008026870 A1 | 12/2009 |
| DE | 102012216693 A1 | 3/2014 |

(Continued)

*Primary Examiner* — Malcolm Barnes
(74) *Attorney, Agent, or Firm* — McCormick, Paulding & Huber PLLC (57) ABSTRACT

An inductor assembly for use in a power converter for transferring power between a DC voltage network and a multiphase AC voltage network.
The inductor assembly comprises a core for guiding magnetic flux and coils for generating magnetic flux wherein the core has first legs with differential mode coil wires wound around the first legs and at least one second leg with at least two common mode coil wires wound around said second leg. The winding direction of both AC- and DC-side coils is such that a common-mode electrical current which flows in both coils in the same direction induces in each core leg a magnetic flux which reinforces the total flux circulating in the core.

20 Claims, 9 Drawing Sheets

(56) References Cited

U.S. PATENT DOCUMENTS

| | | | |
|---|---|---|---|
| 2004/0017689 A1* | 1/2004 | Zhang | H02M 5/45 363/71 |
| 2008/0094159 A1* | 4/2008 | Sodo | H02M 1/126 336/5 |
| 2009/0303652 A1* | 12/2009 | Tallam | H02M 1/126 361/111 |
| 2014/0376293 A1 | 12/2014 | West | |
| 2018/0278141 A1 | 9/2018 | Hasegawa et al. | |
| 2019/0028039 A1* | 1/2019 | Sodo | H02M 1/126 |
| 2019/0089320 A1* | 3/2019 | Kobayashi | H03H 1/00 |
| 2019/0172630 A1* | 6/2019 | Asai | H01F 27/29 |
| 2020/0082971 A1* | 3/2020 | Takahashi | H01F 41/07 |
| 2021/0152077 A1 | 5/2021 | Strandberg et al. | |
| 2021/0353352 A1* | 11/2021 | Petersen | A61B 34/37 |

FOREIGN PATENT DOCUMENTS

| | | | | |
|---|---|---|---|---|
| DE | 102014115782 A1 | | 5/2016 | |
| DE | 102015104660 A1 | * | 9/2016 | |
| DE | 112016006268 T5 | * | 10/2018 | H02M 1/126 |

\* cited by examiner

INDUCTOR ASSEMBLY

CROSS-REFERENCE TO RELATED APPLICATION

This application claims foreign priority benefits under 35 U.S.C. § 119 to German Patent Application No. 102019130839.9 filed on Nov. 15, 2019, the content of which is hereby incorporated by reference in its entirety.

TECHNICAL FIELD

The present invention relates to an inductor assembly preferably used in a power converter for transmitting power between a direct-current (DC) voltage network and a multiphase alternating current (AC) voltage network.

BACKGROUND

Inverters are widely used in power electronics applications in conversion between DC power and AC power. The most common inverter type, PWM-inverter, converts a DC supply voltage into an AC output voltage consisting of pulses with varying widths. The output voltage is here formed by a well-known pulse width modulation (PWM) method with an objective to form the output voltage pulse pattern with a desired fundamental component and minimum content of disadvantageous harmonics.

The instantaneous average value of the PWM voltage pattern is not zero as e.g. in a three-phase symmetric sinusoidal voltage waveform but varies within the DC supply voltage range. An average voltage value other than zero forms a common voltage component for all phases, generating so-called common mode current which circulates in both the DC and AC networks connected to the device and may cause harmful effects to the environment. With generally used modulation methods the common mode voltage and generated common mode current is the higher, the lower is the value of the inverter output AC voltage. In some applications pulse-shaped voltage is not acceptable, so the output AC voltage needs to be filtered closer to sinusoidal waveform. This is the case e.g. in many renewable energy applications, wherein the generated electric power is fed to public energy distribution grid.

Figure 1:
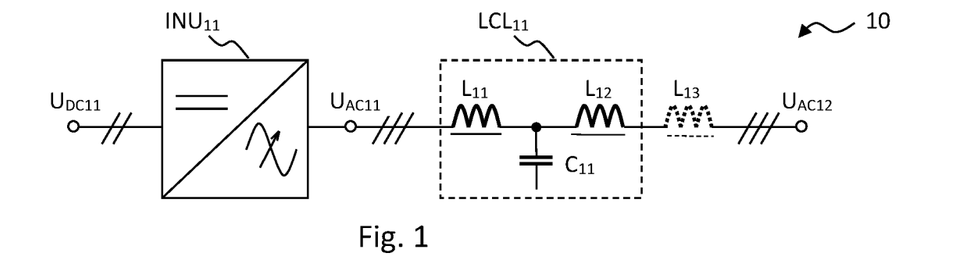
FIG. 1 presents a prior art filter arrangement.

A commonly used filter solution in PWM applications is the so-called LCL filter, coupled between the inverter output terminals and the electric power distribution network as presented in FIG. 1. An LCL filter normally comprises a capacitive filter, coupled between a first and a second inductive filter. The disadvantage of this filter type is the inductive components, which typically are large and heavy, producing considerably power losses. Thus, the filter requires proper enclosure and an efficient cooling arrangement. In order to limit the common mode current an additional common mode inductor may be needed in this filter arrangement. On the whole, the LCL filter increases the size and cost of the installation remarkably.

Figure 2:
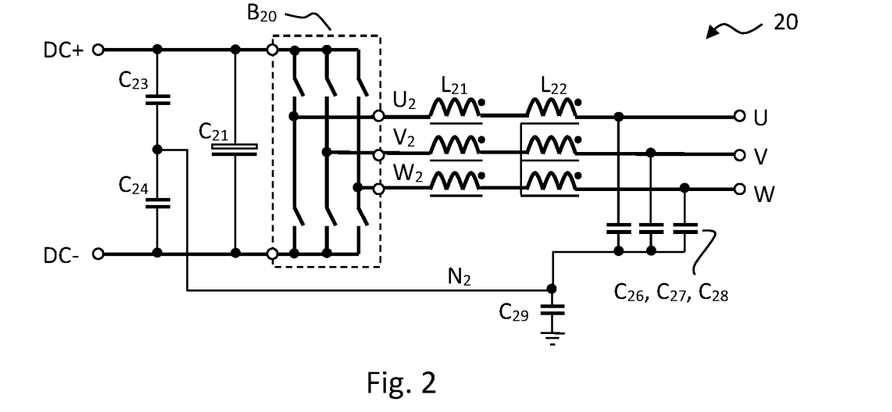
FIG. 2 presents a prior art filter arrangement.

Another known filter solution in PWM applications comprises a series connection of inductors in conjunction with a capacitive filter arrangement, as presented in FIG. 2. In an embodiment of this filter the inductors are located on the same magnetic core structure such that each of the differential mode windings are wound around its own core leg. A drawback of this filter is that the total AC current, i.e. all of its differential mode and common mode components, must flow along both inductors coupled in series. Especially in an operating point with simultaneous low AC output voltage and high output current, the common mode inductor is simultaneously loaded with a worst case common mode current and worst case differential mode current. This situation must therefore be taken as the basis for the design of the common mode coil and magnetic core leg.

SUMMARY

The objective of the present invention is to provide a novel inductor assembly for use in a power converter converting power between a DC voltage network and a multiphase AC voltage network. The invention avoids the disadvantages of the prior art, like a heavy LCL filter circuit or dimensioning of a common mode inductor at simultaneous worst case differential and common mode current components.

According to the present invention the inductor assembly comprises a differential mode coil coupled between each AC terminal of an inverter bridge and each corresponding AC network phase terminal, and a common mode coil coupled between each inverter bridge DC terminal and each corresponding DC network terminal. All coils are located on the same magnetizable core structure such that each of the differential mode coil wires are wound around its own phase-specific core leg and all common mode coil wires are wound around another leg of the core, this leg being different from the leg of the differential mode coils. The coil wires are wound around their core legs such that a common mode electrical current, which flows between the DC and AC networks in the coils in the same direction, induces in each core leg a magnetic flux which reinforces the total magnetic flux which circulates in the core.

The inductor assembly for use in the power converter comprises a core for guiding magnetic flux and coils for generating magnetic flux. The core has first legs with differential mode coil wires wound around the first legs and at least one second leg with at least two common mode coil wires wound around said second leg. The first and second legs are connected via yokes hereby enabling a magnetic flux of flowing from one leg to another through the yokes. The core of the differential coils is in magnetic flux communication with the core of the common mode coils. The advantage of such an inductor assembly design reduced mechanical size and reduced power losses when used in a power converter, especially a power converter using pulse width modulation of a DC voltage for creating an approximation of a sinus curve. Test have been made and it has been found that especially at part load of such PWM modulation there is a significant reduction in power losses. The inventive inductor assembly can for example be used in a frequency converter where the intermediate DC voltage is converted to a sinus shaped voltage via an inverter. The common mode coils are placed in the plus and the minus bus bars respectively and the differential mode coils are placed in series with the output wires of the inverter. The load for the frequency converter is typically a motor.

Advantageously, the common mode inductors are placed next to each other, side by side. The at least two common mode coil wires are wound around the same leg, displaced from each other and essentially without mechanical contact. When impressing electrical current in the coils the induced magnetic flux in the leg will be shared by both coils. Placing the coils side by side allows an easy manufacturing of the inductor assembly.

Advantageously, the coils of the common mode inductor wires are wound coaxially around the second leg such that an inner common mode coil wire is wound around the leg and the other common mode coil wire is wound around said inner coil. The other common mode coil is thus not in direct contact with the leg. The advantage of this design is that the inductor assembly can be made smaller in size as the leg must only have a height corresponding to one coil extension in the longitudinal direction.

In another embodiment the wires of the at least two common mode coil wires are wound as twisted pair around each other and then wound around the second leg. This gives an effective cancellation of any external fields influencing the coils.

The inductor assembly can alternatively have wires of the at least two common mode coil wires which are wound side-by-side or on top of each other around the second leg. This design allows an easier manufacturing than the twisted pair solution.

The common mode coils should be separated by insulation material between the coils and the second leg. The DC voltage can be in the range of 300 to 800 Volts depending on the rating of the power converter and a flat insulation foil will prevent voltage sparks to the second leg. Alternatively, the wire of the coils can be insulated by a thick insulator, but this will increase the thickness of the coil. Correspondingly an insulation between the two common mode coils should be made.

The inductor assembly has a mechanical structure which positions the first and second legs of the core in a straight line next to each other and the ends of the first and second legs being connected to each other by yokes. The legs are placed in a row. This corresponds to an E shaped core but with an extra leg added to the E. In one configuration the core has two legs each with a differential mode coil and one leg with two common mode coils. In another configuration there are three legs for differential mode coils.

The inductor assembly thus has at least three legs in a straight line, one leg being an outer leg, then a middle leg and again an outer leg. Advantageously the two common mode coils are not placed on a middle leg but on one of the outer legs. Hereby an unbalance in the magnetic flux in the core is avoided.

The inductor assembly is in one embodiment different from having legs in a row. Instead the second leg is placed centrally, and the first legs are placed out of center around the centrally placed second leg, the ends of the first and second legs being connected to each other by yokes. This arrangement of legs and coils gives a particularly good distribution of the magnetic flux through the yokes.

The differential mode coil wires on the first legs are advantageously wound in the same direction around the respective legs, i.e. same clock wise or counter clock wise direction. The same applies to the common mode coils on the second leg which coil wires are wound in same direction, i.e. same clockwise or counterclockwise direction.

The inductor assembly is especially useful in power converter when used in connection with a capacitive filter. The differential mode inductor and the common mode inductor are electrically connected to a capacitive filter circuit of the power converter and the differential mode inductor is further connected to an AC network side. The common mode inductor is further connected to an DC network side. This combined inductive and capacitive filter has proven to be especially effective.

According to an embodiment of the invention the DC-side common mode inductor structure includes also a differential mode inductivity such that the differential mode inductivity is less than 15% of the common mode inductivity.

According to an embodiment of the invention the filter arrangement comprises also a capacitive coupling between the DC and AC network terminals. An advantageous filter arrangement includes a first capacitor group comprising a capacitor between each DC network terminal and a star point and a second capacitor group comprising a capacitor between each AC network terminal and the star point.

According to an embodiment of the invention the star point of the capacitive filter arrangement is coupled to ground via a capacitor.

According to the invention, a network of capacitors is coupled from the AC network to the DC network to filter common mode current According to an embodiment of the invention, the invention is employed in a system, wherein the connected AC network has at least two phases and the connected DC network has at least two poles.

According to an embodiment the power converter is provided with the inventive inductor assembly and employed to transmit power between a DC network and a multiphase AC network in a system wherein the power to the DC network is supplied by a battery, by a rectified AC network or by a renewable source, such as a solar panel or a wind turbine.

According to an embodiment of the invention the power converter provided with the inductor assembly arrangement is employed to transmit power between a DC network and a multiphase AC network in a system wherein the power to the AC network is supplied by an AC generator or by an AC network.

According to an embodiment of the invention, the power converter is provided with the inductor assembly and is employed to transmit power between a DC network and a multiphase AC network in a system wherein the DC network is loaded by a battery charger or by an AC motor via an inverter.

According to an embodiment of the invention the power converter is provided with the inductor assembly and employed to transmit power between a DC network and a multiphase AC network in a system wherein the AC network is loaded by an AC network or by an AC motor.

BRIEF DESCRIPTION OF THE DRAWINGS

Below the invention appears a more detailed explanation using examples with references to the enclosed figures, wherein.

DETAILED DESCRIPTION

FIG. 1 presents a simplified main circuit diagram of a prior art power converter 10 for transmitting power between a multiphase AC voltage network $U_{AC12}$ and a DC voltage network $U_{DC11}$, shown as a single line drawing. In the converter arrangement the DC supply voltage $U_{PC11}$ is inverted into a three phase AC voltage $U_{AC11}$ by an inverter unit $INU_{11}$. The output voltage $U_{AC11}$ consists of pulses having an amplitude corresponding to the DC voltage of the intermediate circuit of the inverter unit $INU_{11}$. This voltage can normally not be connected to a public power distribution grid due to the high content of the harmful harmonics of its pulse-like voltage shape. Therefore, this connection must be made through a heavy filter that removes most of the harmful harmonics. Normally the filter, such as $LCL_{11}$ in FIG. 1, consists of a first differential mode inductance $L_{11}$, a second differential mode inductance $L_{12}$ and a capacitance $C_{11}$ between the inductances. In order to limit the common mode current supplied to the AC network also an additional common mode inductor $L_{13}$ may be necessary in the filter arrangement.

FIG. 2 presents a main circuit diagram of another prior art power converter 20 for transmitting power between a DC voltage network having poles DC+, DC− filtered by an energy storage capacitor $C_{21}$, and a 3-phase AC voltage network having phases U, V, W. The inverter bridge $B_{20}$, shown in a simplified form as being obvious for a person skilled in the art, generates a 3-phase output AC voltage. Due to its pulsed shape, the output voltage is filtered to get a sinusoidal waveform by using a filter arrangement which includes a 3-phase differential mode inductor $L_{21}$ and a 3-phase common mode inductor $L_{22}$, connected in series between inverter AC terminals $U_2$, $V_2$, $W_2$ and corresponding network terminals U, V, W. The filter arrangement further includes a first capacitor group $C_{23}$, $C_{24}$ between each DC voltage network pole DC+, DC− and a star point $N_2$, and a second capacitor group $C_{26}$ ... $C_{28}$ between each AC voltage network phase U, V, W and the star point $N_2$. The star point $N_2$ can be connected to earth potential via capacitor $C_{29}$.

Figure 3:
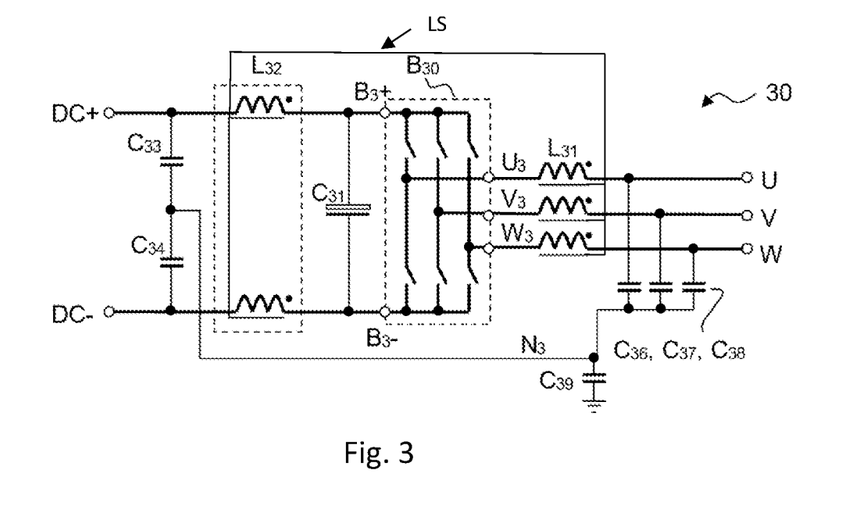
FIG. 3 presents a filter arrangement using an inductor assembly according to the present invention.

FIG. 3 presents main circuit diagram of a power converter 30 for transmitting power between a DC voltage network and a 3-phase AC voltage network. The inverter bridge $B_{30}$ is here similar to that of power converter 20. An energy storage filter capacitor $C_{31}$ is coupled to the DC terminals $B_3+$, $B_3−$ of bridge $B_{30}$.

According to the present invention, the filter arrangement in power converter 30 comprises a common mode inductor $L_{32}$ on the DC voltage network side of the inverter bridge, one coil on both lines between inverter terminals $B_3+$, $B_3−$ and corresponding DC network poles DC+, DC−. Otherwise the filter arrangement is close to that of power converter 20, including a 3-phase differential mode inductor $L_{31}$ between inverter AC terminals $U_3$, $V_3$, $W_3$, and corresponding AC network phases U, V, W. The solid lines next to the inductor symbols represent magnetizable core legs of the inductor coils. The capacitive filter in this exemplary embodiment of the invention comprises a first capacitor group $C_{33}$, $C_{34}$ between each DC voltage network pole DC+, DC−, and a star point $N_3$, and a second capacitor group $C_{36}$-$C_{38}$ between each AC voltage network phase U, V, W, and the star point $N_3$. The star point $N_3$ can be connected to earth potential via capacitor $C_{39}$. The core of common mode inductor $L_{32}$ is connected to the core of differential mode inductor $L_{31}$ via core part LS. Thus, the magnetic fields in the core parts are in direct communication with each other and influence each other.

As is known, at constant output current the inverter DC input power lowered if the AC output frequency is lowered. Thus, also DC input current is low at low output frequencies which brings a remarkable benefit when using the filter arrangement of the present invention due to low power losses in the common mode inductor. In prior art, with all inductors placed on the AC side of the inverter, inductor current and current-proportional losses are not dependent on the output frequency.

Figure 4:
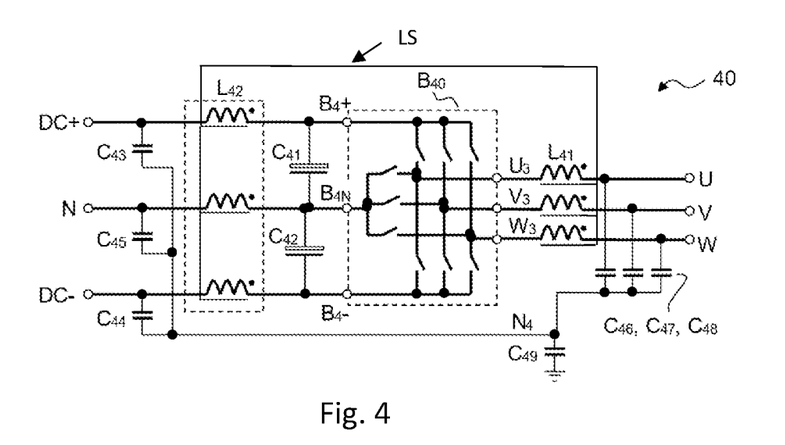
FIG. 4 presents a filter arrangement using an inductor assembly according to the present invention.

The novel idea does not set limitations to the number of AC network phases, e.g. a 1-phase AC supply is a possible embodiment although 3-phase networks are used in the examples in this document. Also, the number of DC network poles can be higher than 2. FIG. 4 presents an example of main circuit diagram of a power converter 40, wherein an inverter bridge $B_{40}$ can generate a 3-step output AC voltage pattern from a dual polarity DC voltage supply. Since these kinds of inverter bridge types—like NPC, TNPC, ANPC— are familiar to a person skilled in the art, the bridge is presented here in simplified form only. A filter arrangement comprises a common mode inductor $L_{42}$ on the DC network side of the inverter bridge, one coil between each inverter DC terminal $B_4+$, $B_{4N}$, $B_4−$, and corresponding DC network pole DC+, N, DC−. Otherwise the filter arrangement is similar to that of power converter 30, including energy storage filter capacitors $C_{41}$, $C_{42}$ at both polarities of the DC supply, a first filter capacitor group $C_{43}$ ... $C_{45}$ between each DC network pole and a star point $N_4$, a second filter capacitor group $C_{46}$ ... $C_{48}$ between each AC network phase and the star point $N_4$, and a capacitor $C_{49}$ for grounding the star point $N_4$.

Figure 5:
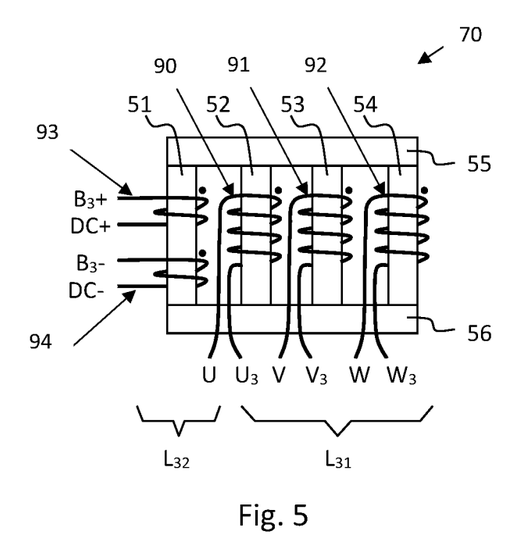
FIG. 5 presents an inductor assembly according to the present invention.

FIG. 5 shows the principal structure of an advantageous exemplary embodiment of an inductor assembly according to the present invention. The magnetizable core of the inductor comprises four legs 51-54 which are connected by yokes 55, 56. The 3-phase differential mode inductor $L_{31}$ (FIG. 3) is formed by the wires around legs 52-54. The common mode inductor $L_{32}$ is formed by the wires wound around a single leg 51. Small black dot next to each coil indicate the direction of winding rotation around a leg, and markings next to coil ends indicate inductor connections to other parts of the converter circuitry in FIG. 3. It should be noted that the common mode inductor windings can also be assembled around separate core legs instead of the single leg 51 presented above.

Figure 6:
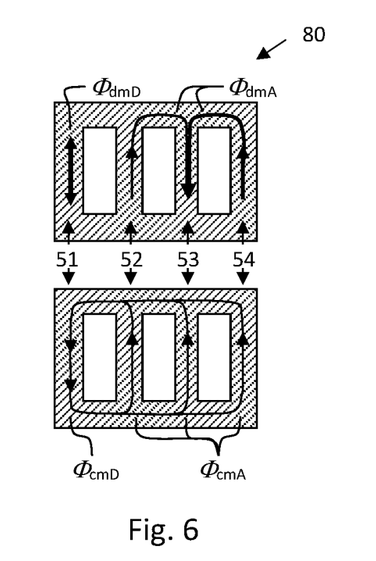
FIG. 6 illustrates magnetic flux flow in the inductor assembly core according to the present invention.

FIG. 6 illustrates the magnetic flux flow in a magnetizable core of FIG. 5. In the figure, the lined area depicts the magnetic core, and the legs are marked by numbers 51-54 like in FIG. 5.

The upper part of the figure illustrates flux flow without common mode current component in the power converter circuit. In this situation, the currents of both windings around leg 51 are equal but opposite (i.e. current from DC+ to $B_3+$ is equal to current from $B_3-$ to DC− in FIG. 3), thus also the magnetic fluxes. $\Phi_{dmD}$ they create in leg 51 are equal and cancel each other out. This means that the common mode inductor has no effect on the converter operation in this situation. The current in each differential mode inductor coil around legs 52-54 creates its own magnetic flux. Normally the sum of the output currents is zero, thus also the sum of fluxes $\Phi_{dmA}$ in legs 52-54 is zero and no part of these fluxes circulates via leg 51 (i.e. despite the common mechanical structure the common mode inductor and differential mode inductor have no effect on each other).

The lower part of FIG. 6 illustrates flux flow with common mode current in the power converter circuit (common mode current=current which flows between the connected DC and AC networks to the same direction in all main circuit lines, e.g. from DC+ to $B_3+$ and DC− to $B_3-$ in FIG. 3). In this situation, the direction of currents of both coils around leg 51 are the same, thus also the direction of magnetic fluxes $\Phi_{cmD}$ they create are the same and reinforce each other. The same common mode current flows also via the differential mode inductor $L_{31}$ coils and, due to direction of inductor winding rotation around the core legs, further reinforces the circulating magnetic flux $\Phi_{cmA}$ in legs 52-54. Thus, in this common mode situation, all coils with windings reinforce the circulating magnetic flux which means that all windings constitute an impedance to the common mode current flow which is advantageous in terms of reduction of the common mode current.

Figure 7:
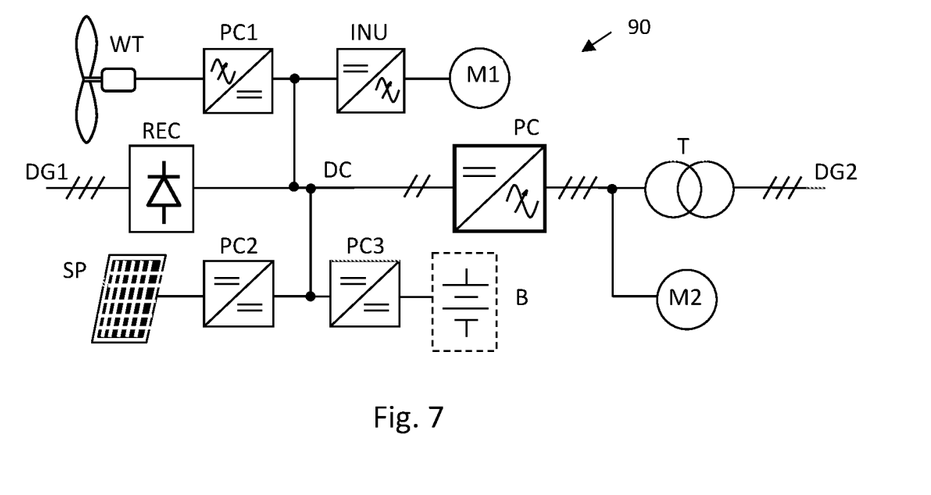
FIG. 7 presents an electric power distribution system according to the present invention.

FIG. 7 presents an example of an electric power distribution system wherein a power converter PC employs a filter arrangement according to the present invention. The figure shows at the principle level various alternatives which, however, do not necessarily occur simultaneously in a real system.

In the example the electric power to the system can be supplied to the DC voltage network by a wind turbine WT via a power converter PC1, by a solar panel SP via a power converter PC2, by an electric power distribution grid DG1 via a rectifier REC or by a battery B via a power converter PC3. It is also possible that the power to the system is supplied from the AC side by an electric power distribution grid DG2 directly or via a transformer T, or by an AC machine M2 working as a generator.

In the example the electric power from the system can be supplied via the DC voltage network to motor M1 via an inverter INU or to a battery via a battery charger PC3. It is also possible that the power from the system is supplied to the AC side loads, like a motor M2 or to an AC voltage grid directly or via a transformer T.

Noteworthy is, that if many inverter units with local energy storage capacitors are connected to a common DC voltage network, the current of the DC voltage link may be increased due to a harmful resonance phenomenon due to apart capacitors and the DC link stray inductance between them. This is why an extra inductance in the DC link may be beneficial in order to decrease the resonance frequency and dampen it. According to the invention, the common mode inductance can contain a small amount of differential mode inductivity, advantageously less than 15% of the common mode inductivity, in order to fulfil this need.

Figure 8:
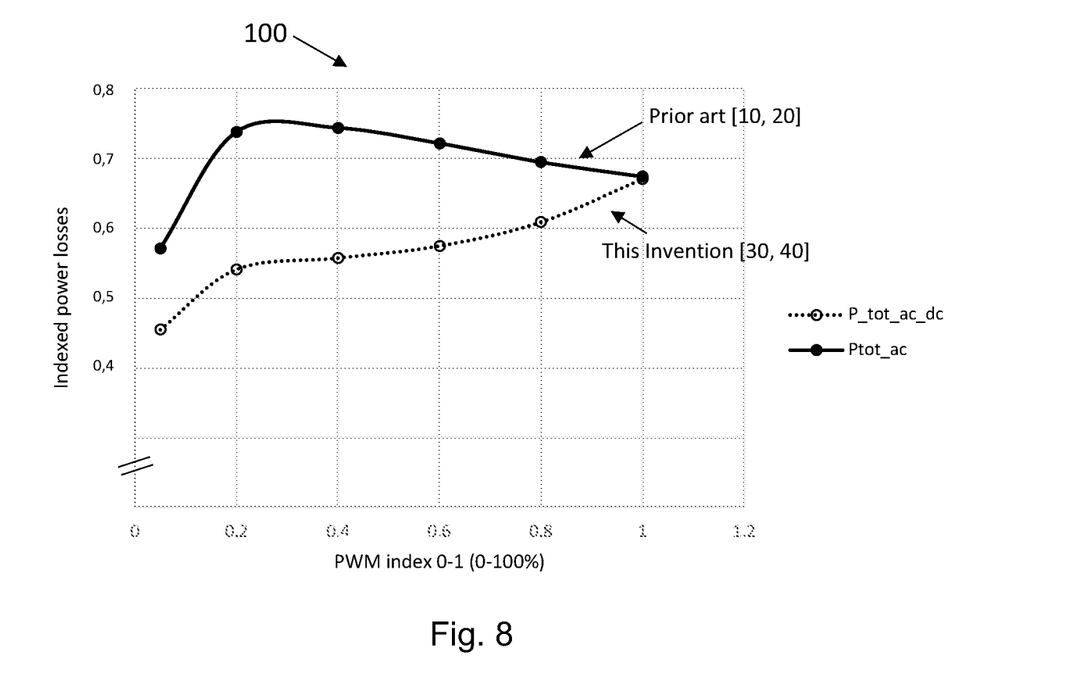
FIG. 8 presents in a graphic, the electrical power loss for the inventive filter arrangement in comparison with prior art.

FIG. 8 is a diagram showing the power loss of the inventive inductor assembly when placed in a setup as shown in FIG. 3. This was measured in real test. The vertical axis represents the power loss in watts (here shown as indexed) and the horizontal axis is the PWM modulation index of the electronic switches in inverter $B_{30}$ of FIG. 3. The PWM index is in a known manner the ratio between the pulse on time and the sum of the pulse off time and on time. It can be seen that at high load, where the PWM index is close to one, there is a smaller difference between the invention and the prior art. At part load, however, the power loss is significantly lower. For example, at PWM index 0.2 the power loss is at index 0.54 whereas it is at 0.74 in the prior art solution.

Figure 9:
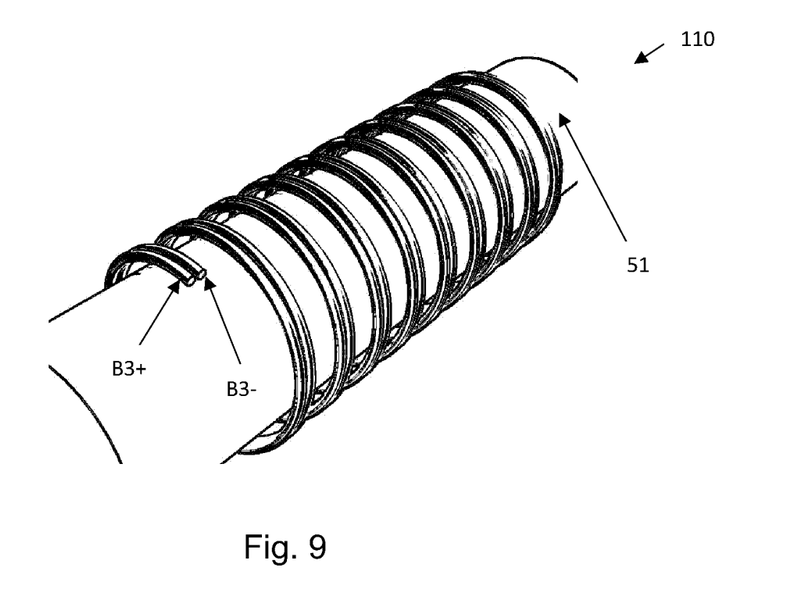
FIG. 9 presents the first inductor arrangement connected to the DC network, multiple wires are wound around a single magnetic core leg next to one another.
Figure 10:
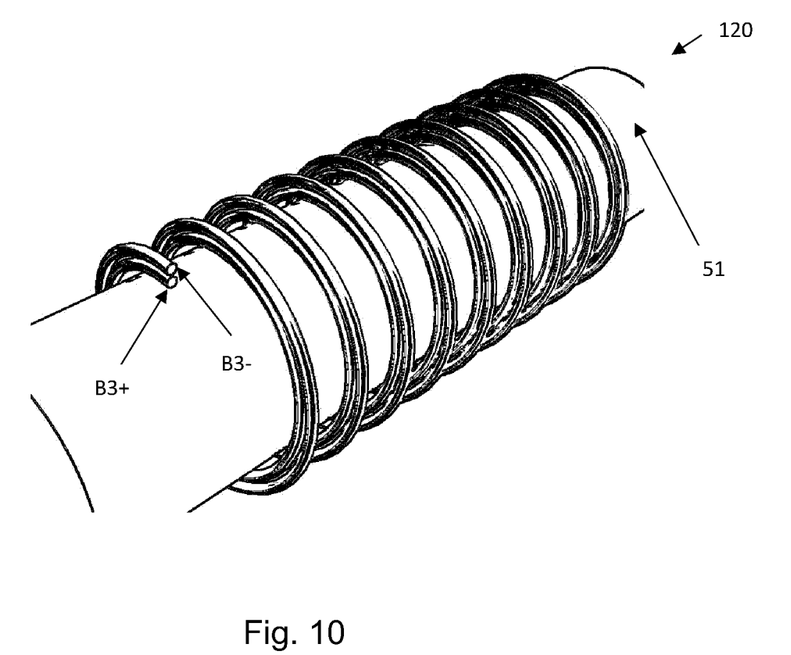
FIG. 10 presents an inductor arrangement connected to the DC network, multiple wires are wound around a single core leg in coaxial layers.
Figure 11:
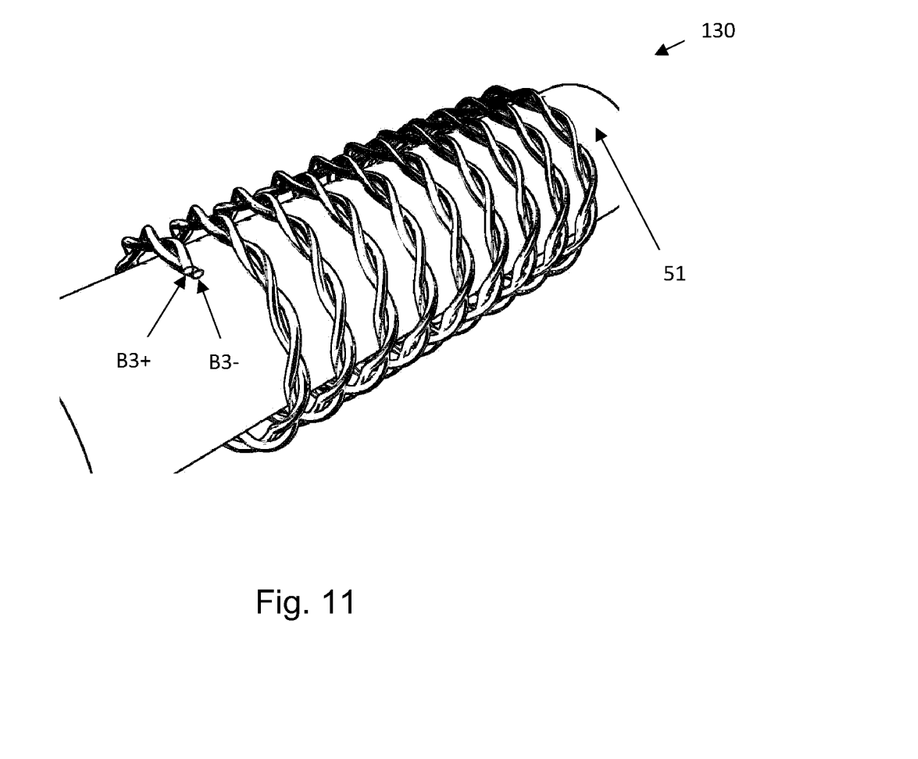
FIG. 11 presents an inductor arrangement connected to the DC network, multiple wires are wound around a single core leg as twisted pairs.
Figure 12:
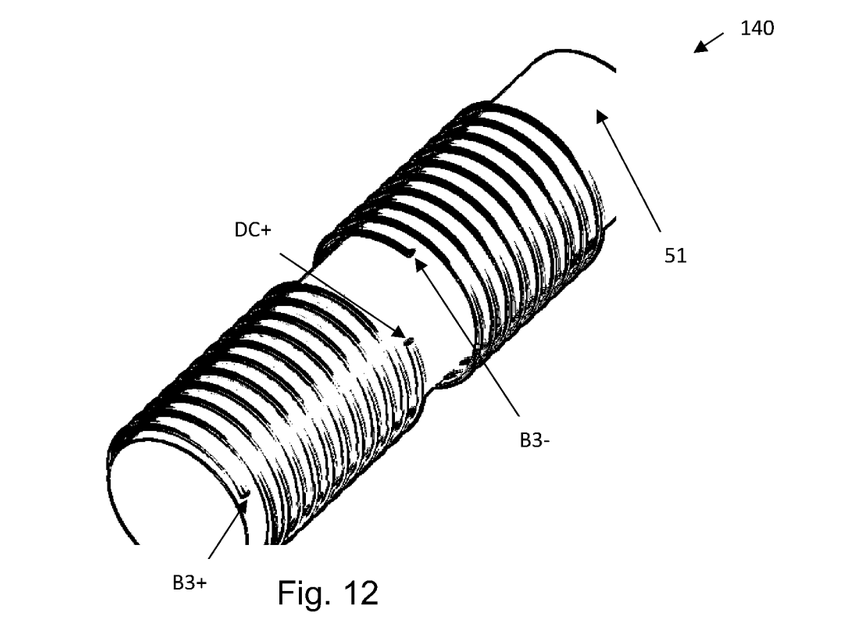
FIG. 12 presents an inductor arrangement connected to the DC network, multiple wires are wound around a single core leg with located next to each other.

FIG. 9 shows the leg 51 of the core where the common mode coil wires are wound coaxially around the leg. The coils correspond to coils 93 and 94 of FIG. 5. They are wound side by side and placed next to each other, position 110. FIG. 10 shows another embodiment where the coils are also side by side but on top of each other 120. In FIG. 11 the common mode coil wires are shown in a twisted-pair arrangement 130 and wound coaxially around core leg 51. In FIG. 12 the coil wires are also wound coaxially around leg 51 but are not in mechanical contact with each other. They are wound side by side on leg 51 but placed around different parts of the same leg.

Figure 13:
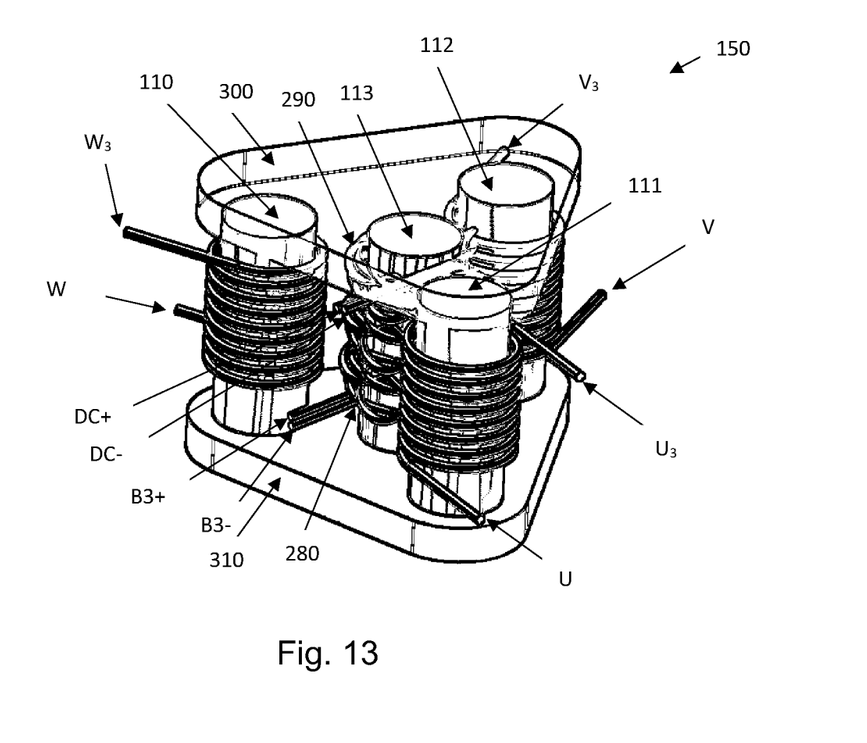
FIG. 13 presents the filter core arrangement, with inductors for DC network in the center and with inductors for AC network located around the inductors for the DC network.
Figure 14:
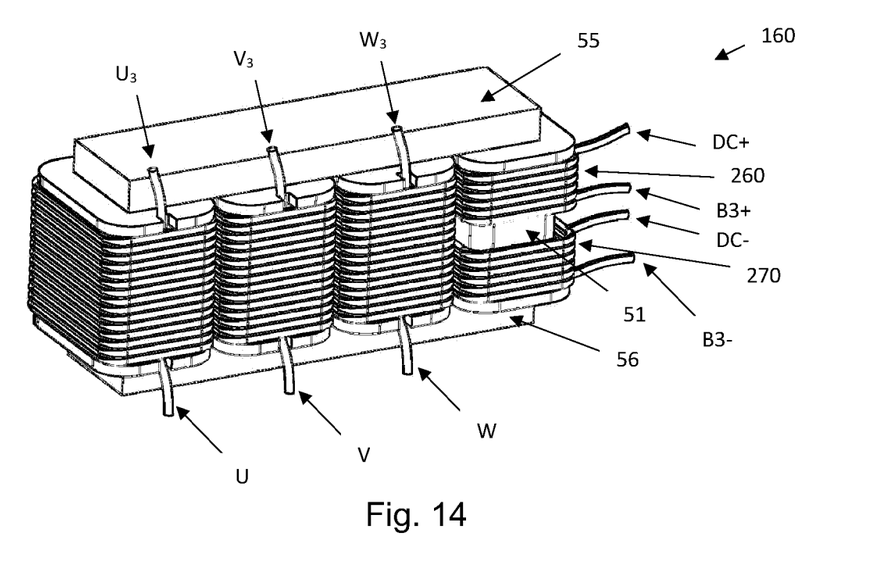
FIG. 14 presents an embodiment of the inventive inductor assembly.
Figure 15:
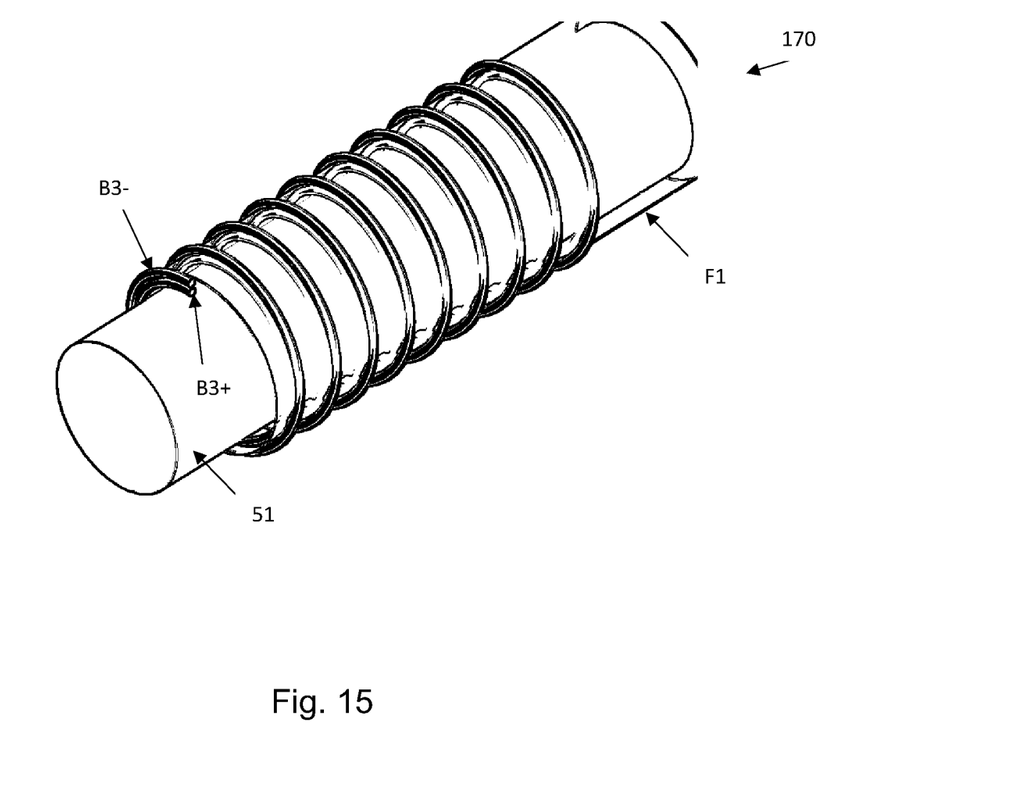
FIG. 15 presents a further embodiment of the invention.

FIG. 13 shows an embodiment of the inventive inductor assembly where the legs 110, 111, 112 and 113 are connected by a top yoke 300 and a bottom yoke 310. Leg 113 is carrying the common mode coils 280 and 290 and the other three legs each has a differential mode coil wires wound around them. The leg for the common mode coils is placed in the middle of the inductor assembly and the legs carrying the differential mode coils are placed equidistantly around the common mode leg 113. For example, the three differential mode legs 110, 111 and 112 form the end points of a triangle which has three angles of each 60 degrees. The magnetic flux paths between the legs are closed via the yokes 300 and 310.

The specific examples provided in the description above are not exhaustive unless otherwise explicitly stated, nor should they be construed as limiting the scope and/or the applicability of the accompanied claims. The features recited in the accompanied dependent claims are mutually freely combinable unless otherwise explicitly stated. The verbs "to comprise" and "to include" are used in this document as open limitations that neither exclude nor require the existence of also un-recited features. Furthermore, it is to be understood that the use of "a" or "an", i.e. a singular form, throughout this document does not exclude a plurality.

What is claimed is:

1. An inductor assembly for use in a power converter, the assembly comprising a core for guiding magnetic flux and coils for generating magnetic flux;

wherein the core has first legs with differential mode coil wires wound around the first legs and at least one second leg with at least two common mode coil wires wound around said second leg;

wherein a first wire of the at least two common mode coil wires has a first end configured for connection to a first network pole and a second end configured for connection to a first terminal of a DC voltage network side of an inverter bridge;

wherein a second wire of the at least two common mode coil wires has a first end configured for connection to a second network pole and a second end configured for connection to a second terminal of the DC voltage network side of the inverter bridge;

wherein a first wire of the differential mode coil wires has a first end configured for connection to a first AC terminal and a second end configured for connection with a corresponding AC network phase; and wherein a second wire of the differential mode coil wires has a first end configured for connection to a second AC terminal and a second end configured for connection with a corresponding AC network phase.

2. The inductor assembly according to claim 1 wherein the coils of the common mode inductor are placed next to each other, side by side.

3. The inductor assembly according to claim 2 wherein the common mode coils are separated by insulation material between the coils and the second leg.

4. The inductor assembly according to claim 2 wherein the first and second legs of the core are positioned in a straight line next to each other and the ends of the first and second legs being connected to each other by yokes.

5. The inductor assembly according to claim 3 wherein the first and second legs of the core are positioned in a straight line next to each other and the ends of the first and second legs being connected to each other by yokes.

6. The inductor assembly according to claim 1 wherein the coils of the common mode inductor wires are wound coaxially around the second leg such that an inner common mode coil wire is wound around the leg and the other common mode coil wire is wound around said inner coil.

7. The inductor assembly according to claim 6 wherein the common mode coils are separated by insulation material between the coils and the second leg.

8. The inductor assembly according to claim 6 wherein the first and second legs of the core are positioned in a straight line next to each other and the ends of the first and second legs being connected to each other by yokes.

9. The inductor assembly according to claim 1 wherein the wires of the common mode coils are wound as twisted pair around each other and then wound around the second leg.

10. The inductor assembly according to claim 9 wherein the common mode coils are separated by insulation material between the coils and the second leg.

11. The inductor assembly according to claim 9 wherein the first and second legs of the core are positioned in a straight line next to each other and the ends of the first and second legs being connected to each other by yokes.

12. The inductor assembly according to claim 1 wherein the wires of the common mode coils are wound side-by-side or on top of each other around the second leg.

13. The inductor assembly according to claim 12 wherein the common mode coils are separated by insulation material between the coils and the second leg.

14. The inductor assembly according to claim 12 wherein the first and second legs of the core are positioned in a straight line next to each other and the ends of the first and second legs being connected to each other by yokes.

15. The inductor assembly according to claim 1 wherein the first and second legs of the core are positioned in a straight line next to each other and the ends of the first and second legs being connected to each other by yokes.

16. The inductor assembly according to claim 15 wherein the inductor assembly has at least three legs in a straight line—an outer leg, a middle leg and an outer leg—and where the two common mode coils are not placed on a middle leg.

17. The inductor assembly according to claim 1 wherein the second leg is placed centrally and the first legs are placed out of center around the centrally placed second leg, the ends of the first and second legs being connected to each other by yokes.

18. The inductor assembly according to claim 1 wherein the differential mode coil wires on the first legs are wound in the same direction around the respective legs, i.e. same clock wise or counter clock wise direction.

19. The inductor assembly according to claim 1 wherein the common mode coil wires on the second leg are wound in same direction, i.e. same clockwise or counterclockwise direction.

20. The inductor assembly according to claim 1 wherein the differential mode inductor and the common mode inductor are electrically connected to an electrical filter circuit in a power converter, the differential mode inductor being further connected to an AC network side and the common mode inductor being further connected are connected to a DC network side.

* * * * *

UNITED STATES PATENT AND TRADEMARK OFFICE
CERTIFICATE OF CORRECTION

PATENT NO. : 12,094,635 B2
APPLICATION NO. : 17/097074
DATED : September 17, 2024
INVENTOR(S) : Stefan Strandberg et al.

It is certified that error appears in the above-identified patent and that said Letters Patent is hereby corrected as shown below:

In the Claims

Claim 6, at Column 9, Line 22, "mode coil wire is wound around the leg and the other" should read as --mode coil wire is wound around the second leg and the other--

Signed and Sealed this
Third Day of December, 2024

*Katherine Kelly Vidal*

Katherine Kelly Vidal
*Director of the United States Patent and Trademark Office*